United States Patent
Kikuchi

(10) Patent No.: US 8,430,540 B2
(45) Date of Patent: Apr. 30, 2013

(54) VEHICLE LAMP HAVING A CONCEALING PORTION

(75) Inventor: Hiroyuki Kikuchi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 485 days.

(21) Appl. No.: 12/726,143

(22) Filed: Mar. 17, 2010

(65) Prior Publication Data
US 2010/0238676 A1  Sep. 23, 2010

(30) Foreign Application Priority Data
Mar. 23, 2009  (JP) ................. 2009-069781

(51) Int. Cl.
*B60Q 3/04* (2006.01)
*F21S 8/10* (2006.01)
*F21V 11/00* (2006.01)
*F21V 21/00* (2006.01)
*F21V 29/00* (2006.01)

(52) U.S. Cl.
USPC ........................... 362/343; 362/507; 362/523

(58) Field of Classification Search .................. 362/544, 362/543, 507, 523
See application file for complete search history.

(56) References Cited

U.S. PATENT DOCUMENTS

| | | | | |
|---|---|---|---|---|
| 5,702,173 A | * | 12/1997 | Kawamura | 362/505 |
| 5,707,129 A | * | 1/1998 | Kobayashi | 362/464 |
| 5,735,591 A | * | 4/1998 | Ruckwied | 362/544 |
| 6,059,436 A | | 5/2000 | Hashigaya | |
| 6,511,215 B2 | * | 1/2003 | Hashigaya | 362/515 |
| 8,147,106 B2 | * | 4/2012 | Eto et al. | 362/523 |
| 2001/0015899 A1 | * | 8/2001 | Kondo et al. | 362/543 |
| 2001/0046139 A1 | * | 11/2001 | Hashigaya | 362/523 |
| 2003/0090905 A1 | * | 5/2003 | Uchida et al. | 362/465 |
| 2005/0083705 A1 | * | 4/2005 | Sakurai | 362/507 |

FOREIGN PATENT DOCUMENTS

JP    07-249303 A    9/1995

OTHER PUBLICATIONS

Chinese Office Action issued in Chinese Application No. 201010140640.4 dated Apr. 6, 2011 and English translation thereof, 9 pages.

* cited by examiner

*Primary Examiner* — Mariceli Santiago
*Assistant Examiner* — Glenn Zimmerman
(74) *Attorney, Agent, or Firm* — Osha Liang LLP

(57) ABSTRACT

A vehicle lamp includes a first lamp unit and a second lamp unit. The first lamp unit includes a first light source, a reflector on which the first light source is mounted, and a first lamp body on which the reflector is supported. The reflector reflects light emitted from the first light source. The second lamp unit includes a second light source, and a second lamp body on which the second light source is mounted. The second lamp body is configured as a one-piece structure including a concealing portion. The concealing portion partially conceals the first lamp unit in a front view of the vehicle lamp.

16 Claims, 3 Drawing Sheets

VEHICLE LAMP HAVING A CONCEALING PORTION

CROSS-REFERENCE TO RELATED APPLICATIONS

The present application claims priority from Japanese Patent Application No. 2009-069781 filed on Mar. 23, 2009, the entire content of which is incorporated herein by reference.

BACKGROUND OF INVENTION

1. Field of the Invention

The present invention relates to a vehicle lamp having a first lamp unit and a second lamp unit.

2. Related Art

A related art vehicle lamp described in JP 7-249303 A includes a first lamp having a first light source, a second lamp having a second light source, and a third lamp unit having a third light source, a reflector on which the first light source and the second light source are mounted, a lamp body through which the first to third light sources are inserted and on which the reflector is tiltably supported via aiming bolts, a front cover attached to the lamp body to form a lamp chamber, and an extension arranged inside the lamp chamber to partially conceal the interior of the lamp chamber in a front view of the vehicle lamp so as to improve appearance of the vehicle lamp. A portion of the extension serves as a reflector of the third lamp unit.

SUMMARY OF INVENTION

According to an illustrative aspect of the present invention, a vehicle lamp is provided. The vehicle lamp includes a first lamp unit and a second lamp unit. The first lamp unit includes a first light source, a reflector on which the first light source is mounted, and a first lamp body on which the reflector is supported. The reflector reflects light emitted from the first light source. The second lamp unit includes a second light source, and a second lamp body on which the second light source is mounted. The second lamp body is configured as a one-piece structure including a concealing portion. The concealing portion partially conceals the first lamp unit in a front view of the vehicle lamp.

Other aspects and advantages of the invention will be apparent from the following description, the drawings and the claims.

DETAILED DESCRIPTION

Hereinafter, an exemplary embodiment of the present invention will be described in detail with reference to the drawings.

Figure 1:
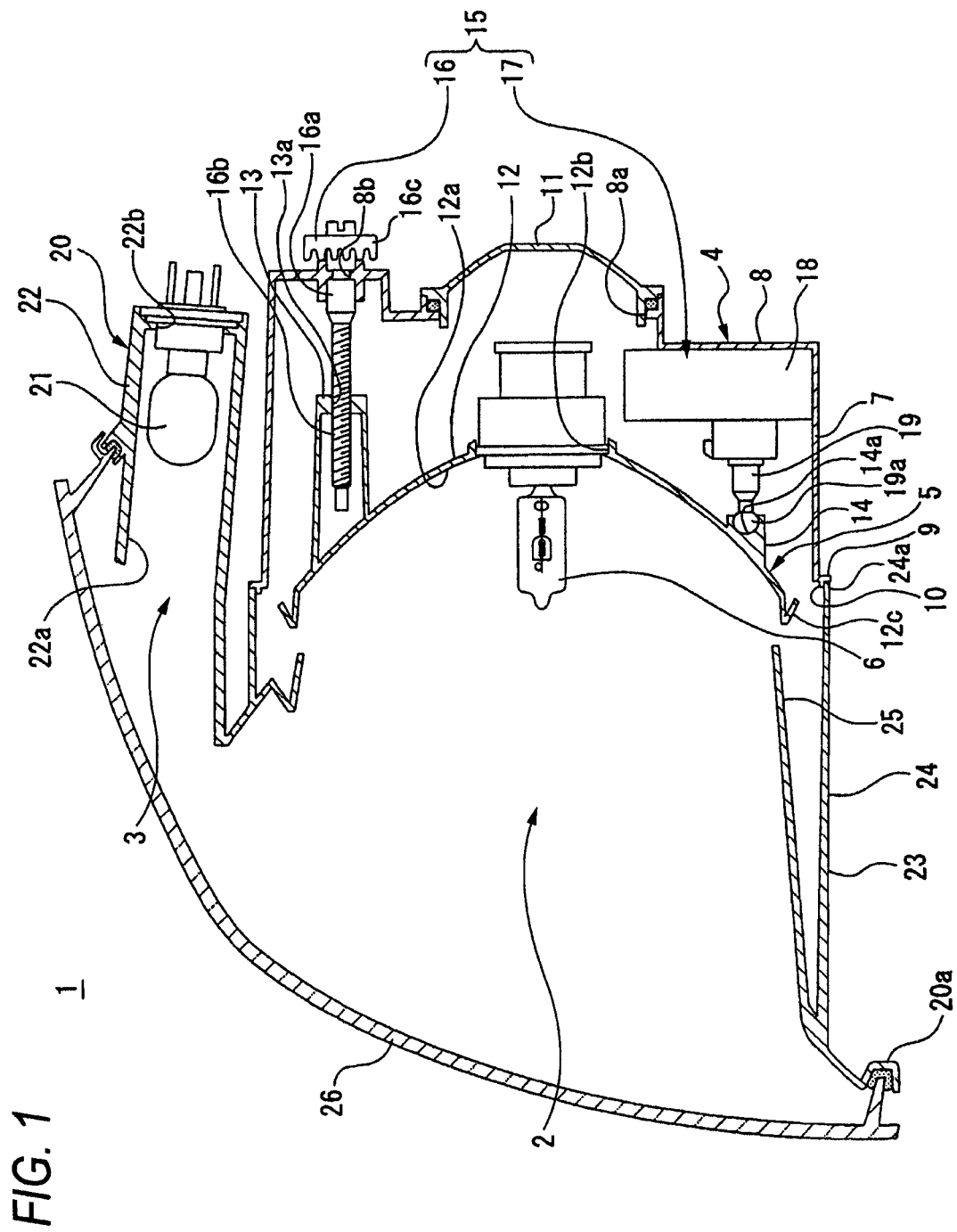
FIG. 1 is a schematic horizontal sectional view of a vehicle lamp according to an exemplary embodiment of the present invention.
Figure 2:
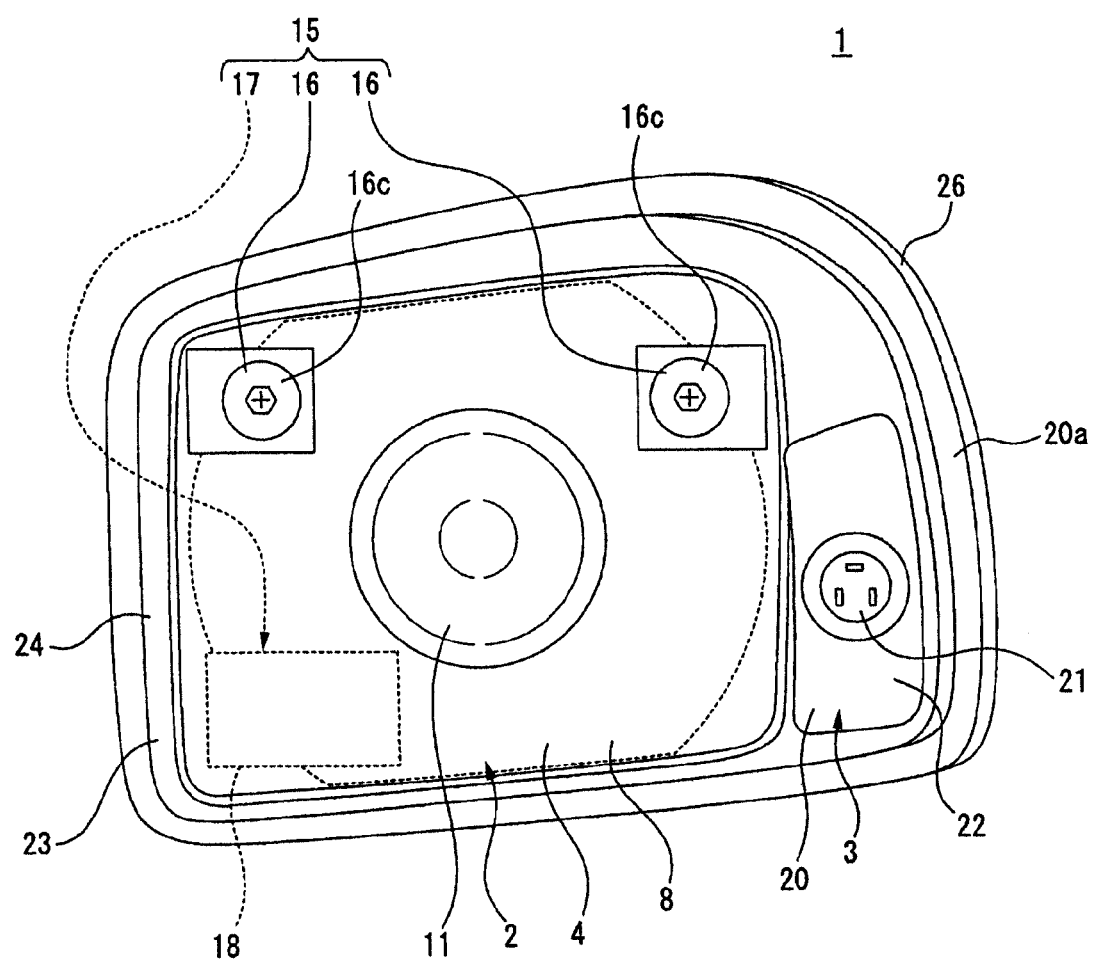
FIG. 2 is a schematic rear view of the vehicle lamp of FIG. 1.

A vehicle lamp 1 according to an exemplary embodiment is illustrated in FIGS. 1 and 2. The vehicle lamp 1 is a combination lamp having a headlamp and another type of lamp. However, the present invention is not limited to such a combination lamp, and is applicable to various combination lamps adapted for a vehicle.

The vehicle lamp 1 is arranged in a pair at right and left portions of a front end of a vehicle. The vehicle lamp 1 illustrated in FIGS. 1 and 2 is adapted to be arranged at the right portion of the front end of the vehicle.

As shown in FIGS. 1 and 2, the vehicle lamp 1 includes a first lamp unit 2 (the headlamp) and a second lamp unit 3 (the another type of lamp).

As shown in FIG. 1, the first lamp unit 2 includes a first lamp body 4, which is recessed toward the rear of the vehicle lamp 1 and is opened at the front, a reflector 5, which is disposed inside the first lamp body 4, and a first light source 6, which is mounted and held on the reflector 5.

The first lamp body 4 includes an annular wall 7, which extends in a front-rear direction of the vehicle lamp 1, a rear wall 8, which contiguously extends from a rear end of the annular wall 7, a flange 9, which outwardly extends from a front end of the annular wall 7, and a positioning protrusion 10, which extends toward the front of the vehicle lamp 1 from a central portion of the flange 9 with respect to a right-left direction of the vehicle lamp 1. The first lamp body 4 is formed as a one-piece structure, including the annular wall 7, the rear wall 8, the flange 9, and the positioning protrusion 10.

A central portion of the rear wall 8 is formed with a fixing hole 8a such that the rear wall 8 is penetrated in the front-rear direction. Further, two supporting holes 8b are formed through the rear wall 8 so as to be spaced apart from each other in the right-left direction. In FIG. 1, only one of the supporting holes 8b is illustrated in order to better illustrate a leveling actuator 17, which will be described later.

A back cover 11 is attached to the rear wall 8 so as to close the fixing hole 8a. The fixing hole 8a is provided in order to fix the first light source 6 to the reflector 5 from the rear side of the first lamp unit 2.

Figure 3:
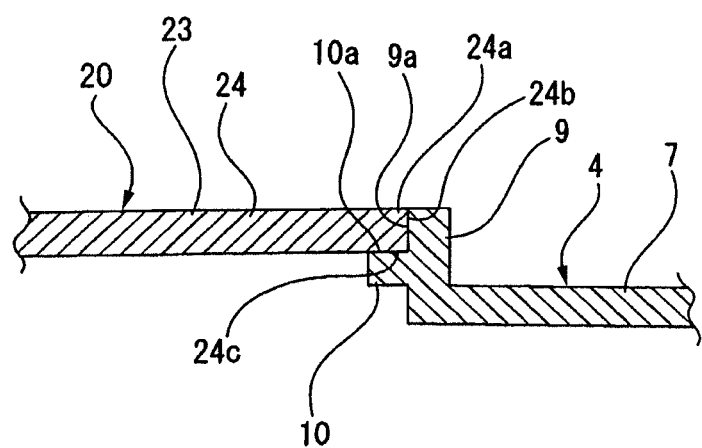
FIG. 3 is an enlarged sectional view of a portion where a first lamp body and a second lamp body are coupled together.

A portion of a front surface of the flange 9, which lies outward from the positioning protrusion 10, and an outer circumferential surface of the positioning protrusion 10 are configured as positioning surfaces 9a, 10a, respectively (see FIG. 3)

As shown in FIG. 1, the reflector 5 includes a reflecting portion 12, which is recessed toward the rear of the vehicle lamp 1 and is opened at the front, two supporting protrusions 13, which are provided on an outer surface of the reflecting portion 12, respectively (again, only one of the supporting protrusions 13 is shown in FIG. 1), and a pivot receiving portion 14. The reflector 5 is formed as a one-piece structure, including the reflecting portion 12, the supporting protrusions 13 and the pivot receiving portion 14.

An inner surface of the reflecting portion 12 is configured as a reflecting surface 12a. A central portion of the reflecting portion 12 is formed with a holding hole 12b such that the reflecting portion 12 is penetrated in the front-rear direction. When seen in the horizontal sectional view, a front end portion 12c of the reflecting portion 12 is bent into a V-shape toward the rear of the vehicle lamp 1.

The supporting protrusions 13 extend from the outer surface of the reflecting portion 12 toward the rear of the vehicle lamp 1, respectively. A rear end portion of each of the supporting protrusions 13 is formed with a screw hole 13a such that the rear end portion is penetrated in the front-rear direction.

The pivot receiving portion 14 has a spherical supporting recess 14a, which is opened toward the rear of the vehicle lamp 1.

The first light source 6 is mounted and held in the holding hole 12b of the reflector 5. The first light source 6 is, for example, a discharge bulb. With this first light source 6, the first lamp unit 2 functions as a headlamp to irradiate light toward a region ahead of vehicle while the vehicle is traveling.

The reflector 5 is tiltably supported by the first lamp body 4 via an optical axis adjusting mechanism 15. The optical axis adjusting mechanism 15 includes two adjusting screws 16 and the leveling actuator 17 (see FIGS. 1 and 2).

The adjusting screws 16 are operated during an aiming adjustment, i.e., an adjustment of an optical axis of the first lamp unit 2 that is carried out before shipping or during vehicle inspection.

Each of the adjusting screws 16 includes a shaft portion 16a, which is configured and arranged to extend in the front-rear direction, a threaded portion 16b, which extends toward the front of the vehicle lamp 1 from the shaft portion 16a, and a rear portion 16c, which is provided on a rear end of the shaft portion 16a. The shaft portion 16a is supported rotatably in the corresponding one of the supporting holes 8b of the rear wall 8 of the first lamp body 4, and the threaded portion 16b is screwed into the screw hole 13a of the corresponding one of the supporting protrusions 13.

The gear portion 16c of the adjusting screw 16 is positioned behind the rear wall 8 of the first lamp body 4 (see FIGS. 1 and 2). By rotating the gear portion 16c using a tool, such as a screwdriver, a relative position of the threaded portion 16b with respect to the screw hole 13a in the front-rear direction is changed, in accordance with a rotated direction and an rotated amount of the gear portion 16c.

The leveling actuator 17 has a case 18, a driving portion provided inside the case 18, and an output shaft 19, which is forwardly projected from a front side of the case 18. A front end portion of the output shaft 19 is configured as a spherical portion 19a. The output shaft 19 is moved along the front-rear direction by a driving force of the driving portion.

The case 18 is attached to an inner surface of a left end portion of the rear wall 8 of the first lamp body 4. The spherical portion 19a is inserted into the supporting recess 14a of the pivot receiving portion 14 of the reflector 5, and is rotatably supported therein.

When one of the adjusting screws 16 is rotated, the reflector 5 is tilted in right and left directions around the supporting protrusion 13 where the threaded portion 16b of the other adjusting screw 16 is supported and also in up and down directions around the pivot receiving portion 14 where the spherical portion 19a of the leveling actuator 17 is supported. The orientation of the optical axis of the first light source 6 is adjusted by this tilting operation of the reflector 5, whereby the aiming adjustment is implemented.

Further, when the output shaft 19 of the leveling actuator 17 is moved in front and rear directions, the reflector 5 is tilted in the up and down directions around the supporting protrusions 13 where the screw shaft portions 16b of the adjusting screws 16 are supported, respectively. The orientation of the optical axis of the first light source 6 is also adjustable by this tilting operation of the reflector 5, which is carried out while the vehicle is traveling, i.e., a leveling adjustment.

The second lamp unit 3 includes a second lamp body 20 and a second light source 21, which is mounted and held on the second lamp body 20.

As shown in FIG. 1, the second lamp body 20 includes a light source mounting portion 22 and a coupling portion 23. The mounting portion 22 is disposed on the right rear side of the coupling portion 23 (see also FIG. 2). The second lamp body 20 is formed as a one-piece structure, including the mounting portion 22 and the coupling portion 23.

On an outer circumferential portion of the second lamp body 20, a cover fixing portion 20a is provided.

The light source mounting portion 22 is configured in a cylindrical form, and is disposed to extend in the front-rear direction. An inner circumferential surface of the light source mounting portion 22 is formed as a light controlling surface 22a. A rear side of the light source mounting portion 22 is formed with a holding hole 22b.

The second light source 21 is mounted and held in the holding hole 22b. The second light source 21 is, for example, a halogen lamp. With this second light source 21, the second lamp unit 3 may function as a turn signal lamp to indicate a direction in which the vehicle is turning or as a daytime running lamp to increase conspicuity of the vehicle during the daytime.

The coupling portion 23 has an annular wall 24 and a concealing portion 25, which rearwardly extends from a front end portion of the annular wall 24 in a slightly inward direction and substantially along the annular wall 24. A rear end portion of the annular wall 24 is configured as a joining portion 24a to which the first lamp body 4 is coupled. As shown in FIG. 3, a rear end face of the joining portion 24a is configured as a first abutting face 24b, and an inner circumferential surface of the joining portion 24a is configured as a second abutting face 24c.

The first abutting face 24b and the second abutting face 24c of the joining portion 24a are brought into contact with the positioning surface 9a of the flange 9 and the positioning surface 10a of the positioning protrusion 10, respectively, whereby the second lamp body 20 is positioned with respect to the first lamp body 4, and is coupled to the first lamp body 4.

The first lamp body 4 and the second lamp body 20 may be coupled together such that the positioning protrusion 10 of the first lamp body 4 is fitted inside the joining portion 24a of the second lamp body 20 in a detachable manner. That is, the first lamp body 4 and the second lamp body 20 may be detached from each other by applying a force to the first lamp body 4 or to the second lamp body 20 so as to flex the first lamp body 4 or to the second lamp body 20.

The configuration for coupling the first lamp body and the second lamp body 20 in a detachable manner is not limited to the fitting configuration described above. For example, the first lamp body 4 and the second lamp body 20 may be coupled together by using a clip, such as a spring clip. In one or more embodiments, one of the first lamp body 4 and the second lamp body 20 may be formed with an elastically deformable engaging portion that engages with the other of first lamp body 4 and the second lamp body 20 to couple the first lamp body 4 and the second lamp body 20.

Because the first lamp body 4 and the second lamp body 20 are coupled together in a detachable manner as described above, it is possible to improve handling and working efficiency when repairing or replacing one or more components of the first lamp unit 2 and/or the second lamp unit 3. For example, when repairing or replacing the first light source 6 of the first lamp unit 2, the first lamp body 4 is detached from the second lamp body 20 so that the first light source 6 can be handled from the front side of the first lamp unit 2.

Nevertheless, in one or more embodiments, the first lamp body 4 and the second lamp body 20 may be coupled in a substantially undetachable manner. For example, the first lamp body 4 and the second lamp body 20 can be fixed together by bonding or welding, such as laser welding and flat fusion welding.

As shown in FIG. 1, when the first lamp body 4 and the second lamp 20 are coupled together, the concealing portion 25 of the second lamp body 20 is positioned in front of the front end portion 12c of the reflector 5 such that the concealing portion 25 conceals the front end portion 12c of the reflector 5 in the front view of the vehicle lamp 1.

More specifically, the concealing portion 25 conceals a space between the annular wall 7 of the first lamp body 4 and the reflector 5 regardless of the aiming adjustment or the leveling adjustment, which causes a change in the space between the annular wall 7 of the first lamp body 4 and the reflector 5. Therefore, it is possible to improve external appearance of the vehicle lamp 1.

A front cover 26 is attached to the cover fixing portion 20a of the second lamp body 20, whereby the first lamp body 4, the reflector 5, the first light source 6, the second lamp body 20 and the second light source 21 are covered from the front by the front cover 26.

When the first lamp body 4 and the second lamp 20 are coupled together, a part of the cover fixing portion 20a of the second lamp body 20 is positioned further toward the rear of the vehicle lamp 1 than the front end portion 12c of the reflector 5. This part of the cover fixing portion 20a is less likely to be affected than the other part of the cover fixing portion 20a by heat generated due to a light emission from the first light source 6, so that a reduction in strength of the cover fixing portion 20a can, at least partially, be prevented.

In the vehicle lamp 1 having the configuration described above, when the first light source 6 is turned on, light emitted from the first light source 6 is reflected toward the front by the reflector 5, and is irradiated through the front cover 26.

When the second light source 21 is turned on, light emitted from the second light source 21 is controlled by the light controlling surface 22a, and is irradiated through the front cover 26, such that the traveling direction of the light is controlled to have a desired irradiation range.

As described above, the vehicle lamp 1 has the first lamp body 4 and the second lamp body 20, and the concealing portion 25, which is part of the one-piece structure of second lamp body 20, functions as an extension by concealing a part of the first lamp unit 2. Therefore, it is not necessary to separately provide an extension member. Accordingly, manufacturing cost is lowered by reducing the number of required components. For example, because an extension member need not be arranged or fixed to another component, it is possible to improve efficiency of the assembling work of the vehicle lamp 1.

Further, the first lamp body 4 has the positioning protrusion 10, which serves to position the second lamp body 10 with respect to the first lamp body 4. Therefore, the positioning of the first lamp body 4 and the second lamp body 20 can be facilitated in a reliable manner.

While description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

For example, while the positioning protrusion 10 is provided on the first lamp body 4 in the exemplary embodiments described above, the positioning protrusion may alternatively be provided on the second lamp body 20 to position the first lamp body 4 with respect to the second lamp body 10.

Further, while the first lamp unit 2 and the second lamp unit 3 are provided one for each in the exemplary embodiments described above, the number of first lamp unit 2 and second lamp unit 3 provided is optional. That is, embodiments of the present invention are applicable to a vehicle headlamp having at least one first lamp unit 2 and at least one second lamp unit 3.

The first lamp unit may be configured so as to be able to be coupled to a lamp unit which is different from the second lamp unit 3. By configuring the first lamp unit 2 so as to be able to be coupled to different lamp units, the components of the first lamp unit 2 can be standardized, so that manufacturing cost can be reduced.

The shapes and configurations of the respective components of the vehicle lamp 1 described above are merely examples in implementing embodiments of the present invention. Therefore, it should be understood that the technical scope of the present invention is not limited to only those examples.

What is claimed is:

1. A vehicle lamp comprising:
   a first lamp unit comprising:
      a first light source,
      a reflector on which the first light source is mounted, and
      a first lamp body on which the reflector is supported, wherein the reflector reflects light emitted from the first light source; and
   a second lamp unit comprising:
      a second light source, and
      a second lamp body on which the second light source is mounted; and
   an optical axis adjusting mechanism that tiltably couples the reflector to the first lamp body,
   wherein the second lamp body is configured as a one-piece structure comprising a concealing portion,
   wherein the concealing portion partially conceals the first lamp unit in a front view of the vehicle lamp,
   wherein the optical axis adjusting mechanism is operable to adjust an optical axis of the first lamp unit, and
   wherein the concealing portion entirely conceals in the front view a space directly between an annular wall of the first lamp body and the reflector when the space is maximum for the adjustment by the optical axis adjusting mechanism.

2. The vehicle lamp according to claim 1, wherein the first lamp body and the second lamp body are adjacently coupled to each other in a detachable manner.

3. The vehicle lamp according to claim 2,
   wherein one of the first lamp body and the second lamp body comprises a positioning protrusion, and
   wherein the positioning protrusion positions the other of the first lamp body and the second lamp body with respect to said one of the first lamp body and the second lamp body.

4. The vehicle lamp according to claim 1,
   wherein the first lamp body and the second lamp body are adjacently coupled to each other,
   wherein one of the first lamp body and the second lamp body comprises a positioning protrusion, and
   wherein the positioning protrusion positions the other of the first lamp body and the second lamp body with respect to said one of the first lamp body and the second lamp body.

5. The vehicle lamp according to claim 2, wherein, when the first lamp body is detached from the second lamp body, the entire first lamp unit is detached from the second lamp unit.

6. The vehicle lamp according to claim 2, further comprising: wherein the concealing portion conceals a space between the first lamp body and the reflector, and wherein the optical axis adjusting mechanism is attached to the first lamp unit such that, when the first lamp body is detached from the second lamp body, the first lamp unit and the optical axis adjusting mechanism are detached from the second lamp unit.

7. The vehicle lamp according to claim 1, further comprising:
a cover through which light emitted from the first light source and light emitted from the second light source are irradiated outside the vehicle lamp,
wherein the cover is attached to the second lamp body.

8. The vehicle lamp according to claim 4, further comprising:
a cover through which light emitted from the first light source and light emitted from the second light source are irradiated outside the vehicle lamp,
wherein the cover is attached to the second lamp body.

9. A method of manufacturing a vehicle lamp comprising:
providing a first lamp unit comprising:
a first light source,
a reflector on which the first light source is mounted, and
a first lamp body on which the reflector is supported, wherein the reflector reflects light emitted from the first light source;
providing a second lamp unit comprising:
a second light source, and
a second lamp body on which the second light source is mounted;
providing an optical axis adjusting mechanism that tiltably couples the reflector to the first lamp body; and
configuring the second lamp body as a one-piece structure comprising a concealing portion,
wherein the concealing portion partially conceals the first lamp unit in a front view of the vehicle lamp,
wherein the optical axis adjusting mechanism is operable to adjust an optical axis of the first lamp unit, and
wherein the concealing portion entirely conceals in the front view a space directly between an annular wall of the first lamp body and the reflector when the space is maximum for the adjustment by the optical axis adjusting mechanism.

10. The method according to claim 9, further comprising adjacently coupling the first lamp body and the second lamp body to each other in a detachable manner.

11. The method according to claim 10,
wherein one of the first lamp body and the second lamp body comprises a positioning protrusion, and
wherein the positioning protrusion positions the other of the first lamp body and the second lamp body with respect to said one of the first lamp body and the second lamp body.

12. The method according to claim 9,
further comprising adjacently coupling the first lamp body and the second lamp body to each other,
wherein one of the first lamp body and the second lamp body comprises a positioning protrusion, and
wherein the positioning protrusion positions the other of the first lamp body and the second lamp body with respect to said one of the first lamp body and the second lamp body.

13. The method according to claim 10, wherein, when the first lamp body is detached from the second lamp body, the entire first lamp unit is detached from the second lamp unit.

14. The method according to claim 10, further comprising: wherein the concealing portion conceals a space between the first lamp body and the reflector; and attaching the optical axis adjusting mechanism to the first lamp unit such that, when the first lamp body is detached from the second lamp body, the first lamp unit and the optical axis adjusting mechanism are detached from the second lamp unit.

15. The method according to claim 9, further comprising:
providing a cover through which light emitted from the first light source and light emitted from the second light source are irradiated outside the vehicle lamp, and
attaching the cover to the second lamp body.

16. The vehicle lamp according to claim 12, further comprising:
providing a cover through which light emitted from the first light source and light emitted from the second light source are irradiated outside the vehicle lamp, and
attaching the cover to the second lamp body.

* * * * *